(12) United States Patent
Shariff et al.

(10) Patent No.: US 7,505,962 B2
(45) Date of Patent: Mar. 17, 2009

(54) RATING AND SETTLEMENTS ENGINE

(75) Inventors: Shafiq Shariff, Redmond, WA (US);
Indrojit N. Deb, Redmond, WA (US);
Neeraj Garg, Redmond, WA (US);
Ganesh Gopalakrishnan, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 148 days.

(21) Appl. No.: 11/383,436

(22) Filed: May 15, 2006

(65) Prior Publication Data

US 2007/0288933 A1 Dec. 13, 2007

(51) Int. Cl.
*G06F 7/00* (2006.01)
*G06F 17/30* (2006.01)
*G06F 15/16* (2006.01)
*G06Q 30/00* (2006.01)
*G07G 1/14* (2006.01)

(52) U.S. Cl. .............................. 707/2; 709/205; 705/14

(58) Field of Classification Search ...................... None
See application file for complete search history.

(56) References Cited

U.S. PATENT DOCUMENTS

| | | | |
|---|---|---|---|
| 6,195,685 B1 * | 2/2001 | Mukherjee et al. ........... 709/205 |
| 6,952,712 B2 * | 10/2005 | Yoshimura et al. .......... 709/201 |
| 7,143,067 B1 * | 11/2006 | Cheston et al. ................ 705/59 |
| 7,197,561 B1 * | 3/2007 | Lovy et al. .................... 709/224 |
| 2005/0060281 A1 * | 3/2005 | Bucher et al. ................... 707/1 |
| 2006/0184417 A1 * | 8/2006 | Van der Linden et al. ..... 705/14 |
| 2007/0150294 A1 * | 6/2007 | Rusman et al. ................. 705/1 |

* cited by examiner

*Primary Examiner*—Mohammad Ali
*Assistant Examiner*—Alexey Shmatov
(74) *Attorney, Agent, or Firm*—Lee & Hayes, PLLC

(57) ABSTRACT

A rating and settlements engine synthesizes activity data to discover ratable events. The ratable events are processed to produce a rated event. In a described implementation, the ratable events are discovered responsive to an event-generation plug-in and/or the rated events are produced from the ratable events responsive to a rating-model plug-in.

14 Claims, 8 Drawing Sheets

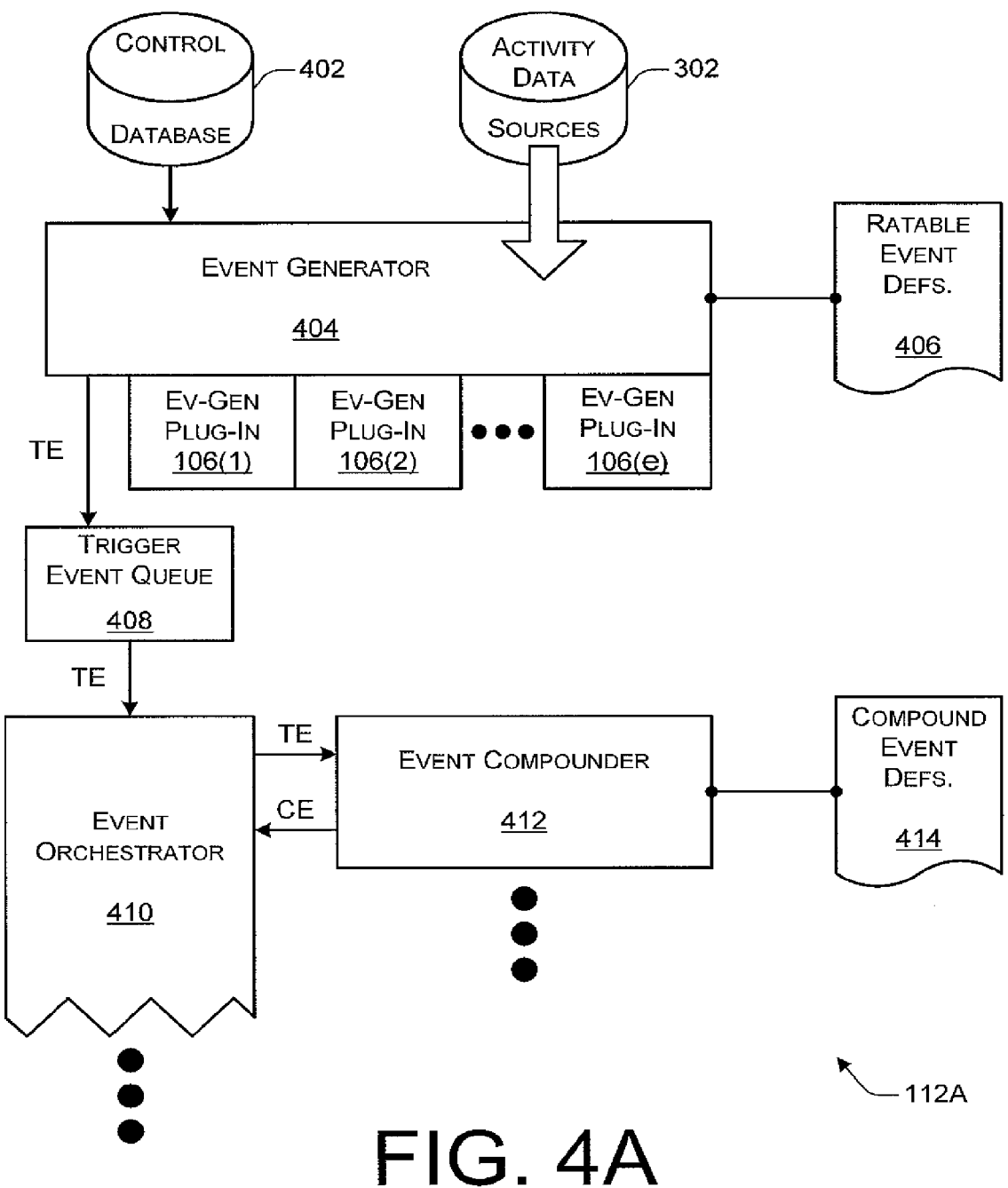
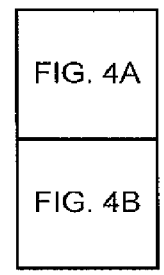
FIG. 4A
FIG. 4

600

RATING AND SETTLEMENTS ENGINE

BACKGROUND

Manufacturers of computers usually pre-load a number of programs on each new computer. When a consumer purchases a new computer, the consumer can run one of the pre-loaded programs. One type of program that is usually pre-loaded onto new computers is a program providing access to the internet.

These internet access programs are applications that enable a consumer to access the internet through a particular internet service provider (ISP). The consumer, however, typically establishes an account with the ISP in order to use the internet access program on an ongoing basis. In other words, the consumer pays the ISP a sum of money each month.

The ISP therefore gains a monthly recurring revenue stream from this consumer as a result of the pre-loaded internet access program. In many cases, the ISP has agreed to pay the manufacturer of the computer some portion of the monthly revenue stream. Consequently, the ISP is obligated to divert a portion of the recurring revenue stream received from the consumer to the manufacturer of the consumer's computer.

SUMMARY

A rating and settlements engine synthesizes activity data to discover ratable events. The ratable events are processed to produce a rated event. In a described implementation, the ratable events are discovered responsive to an event-generation plug-in and/or the rated events are produced from the ratable events responsive to a rating-model plug-in.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc implementations are described herein.

BRIEF DESCRIPTION OF THE DRAWINGS

The same numbers are used throughout the drawings to reference like and/or corresponding aspects, features, and components.

FIGS. 4, 4A, and 4B form a block diagram that illustrates example components of the rating and settlements engine.

DETAILED DESCRIPTION

INTRODUCTION

Figure 1:
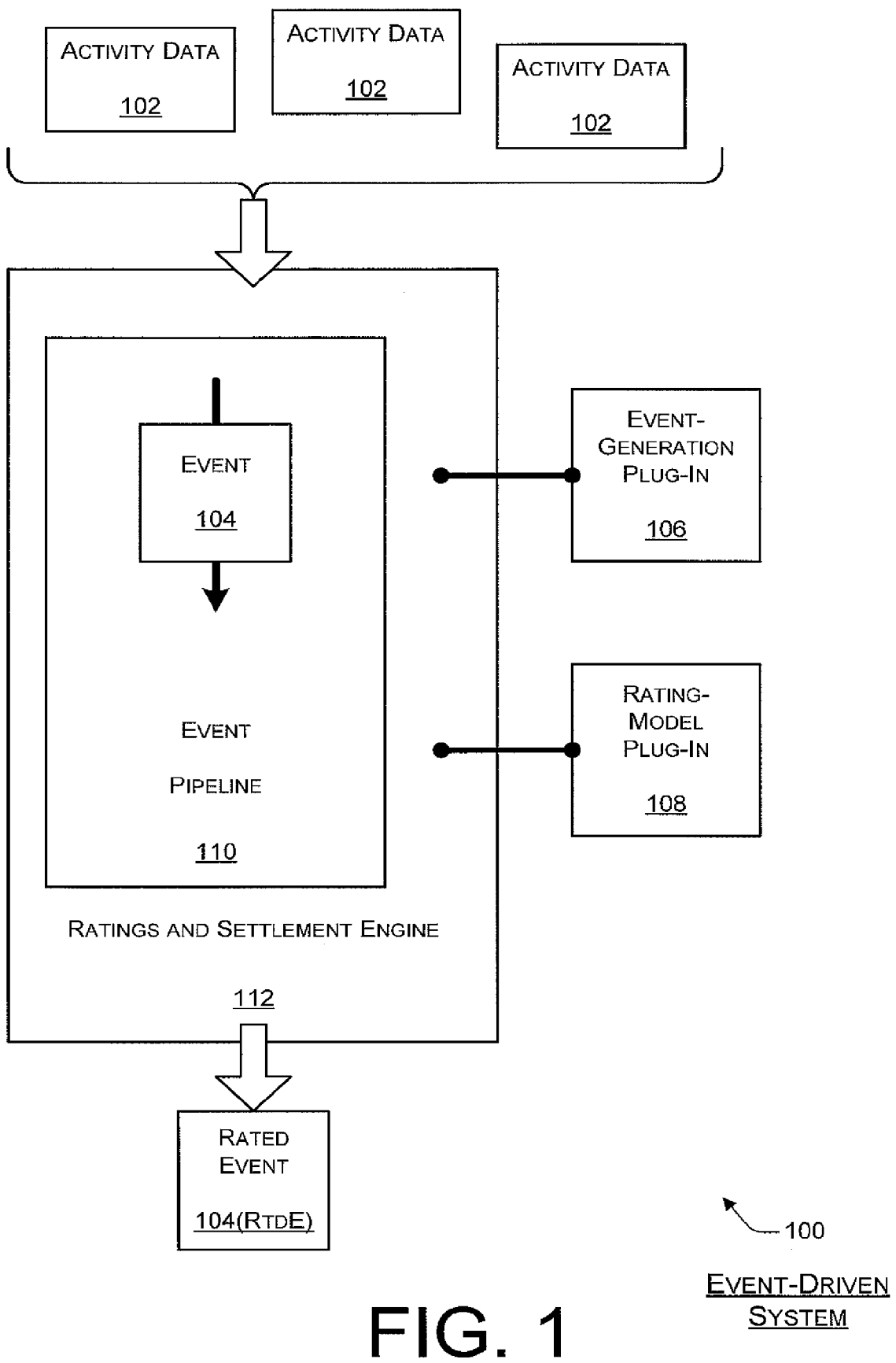
FIG. 1 is a block diagram of an example rating and settlements engine that includes an event pipeline and that entails an event-driven system.

As described above, ISPs are often obligated to share the monthly recurring revenue stream from a customer with the manufacturer of the customer's computer when the customer signed up with the ISP using a program that the manufacturer pre-loaded onto the customer's computer. There are, however, other scenarios when there is an obligation to share revenue. For example, a web service provider may wholesale its service to a network provider such that the network provider is obligated to pay the web service provider a portion of revenue. Other examples include payments for click-throughs on web advertisements and/or search results, the sharing of revenue from sales of physical items, and so forth.

Furthermore, there are a myriad of other contractual relationships and/or business models in which payments are obligated to be exchanged and revenue is to be shared or shredded between two or more contracting partners in a given value chain. These myriad of contractual relationships result in diverse settlement scenarios that include, but are not limited to:

driving distribution by paying a referral partner for acquired subscribers for every settled payment;

paying fees for external services bundled in web service subscriptions to increase value to a customer;

billing wholesale distributors who bundle web service subscriptions with their products;

charging token distributors for point of sale token activations;

driving usage by providing incentives to distributors of free web service products and services;

increase ad exposure by sharing advertising revenue with publishers and distributors;

settle royalty payments for the sale of digital goods;

reward affiliates for products purchased based on recommendations; and charge transaction fees for the transfer of money based on transaction volume and seller classification.

In certain implementations as described herein, any one or more of the above-listed settlement scenarios can be correctly invoiced with an event-driven system. An implementation of the event-driven system as described herein takes many of the patterns common to online service business models and makes them scalable and configurable. This can greatly reduce the time and cost of implementing new business models. It therefore facilitates the addition of new partners and new contracts as well as new plans to existing business models.

Certain implementations of a rating and settlements engine as described herein can provide one or more of the following features:

Consume and correlate various data sources or direct user activity as part of the rating:
Includes Subscriptions, Billing, Tokens, Points, Usage, Ads, Search, Direct User Activity, etc.
Identify data that initiates a rating
Synchronize dependent data sources prior to consumption
Input events from different types of sources: databases, files, asynchronous queues, APIs, OLAP cubes, etc.
Isolation of data source dependences to a single point of translation into ratable events Quickly enable settlement scenarios with merchants:
Rapid on-boarding of rating rules for new partners, contracts, and plans on existing models Fast implementation of new rating models to support a dynamic business Translation of business concepts to implemented events Create multi-way settlements based on a single incoming transaction Provides generic state management, tiering, and aggregation capabilities Support different sizes of merchants:
  Large, Medium, and Small
  Scale-out to the number of merchants and billing transactions by adding hardware Integrate with external systems for settlement:
  Business operations, payment gateways, loyalty programs, back-office systems (e.g., SAP), etc.

Standard contract-related abilities:
  Reprocessing, audit-ability, etc.

Reliability:
  Failover, restartability, quarantine, rule validation, etc.

Providing these capabilities in different processing modes:
  batch, hosted service, inline, etc.

An example business model in which revenue gained from a subscription is shared by the partner who referred the subscriber to a web service may be termed a "Subscription Referral Revenue Share Model". In a described implementation, this specific example business model may be used with a rating and settlements engine by implementing the following:

ensuring that subscription data is synchronized with the billing data source prior to processing;

allocating batches of events to multiple servers so that each processes a part of the work (for scalability);

identifying settled payments that initiate settlement;

correlating settled payments with the referring partner;

allowing the addition of rating rules that specify the tiers and rates to be paid to the referring partner; and adding the settlements to a database from which invoices can be generated.

The remainder of the "Detailed Description" is divided into three sections. A first section is entitled "General Example Implementations for a Rating and Settlements Engine" and references FIGS. 1, 2, and 3. A second section is entitled "Specific Example Implementations for a Rating and Settlements Engine" and references FIGS. 4, 4A, 4B, 5, and 6. A third section is entitled "Example Device Implementations for a Rating and Settlements Engine" and references FIG. 7.

GENERAL EXAMPLE IMPLEMENTATIONS
FOR A RATING AND SETTLEMENTS ENGINE

FIG. 1 is a block diagram of an example rating and settlements engine 112 that includes an event pipeline 110 and that utilizes an event-driven system 100. As illustrated, event-driven system 100 includes activity data 102, a rating and settlements engine 112, and a rated event 104(RtdE). Rating and settlements engine 112 includes an event pipeline 110 and is capable of accepting two plug-in types: event-generation plug-ins 106 and rating-model plug-ins 108. Although only a single event-generation plug-in 106 and rating-model plug-in 108 are shown, rating and settlements engine 112 may accept multiple plug-ins of each type.

In a described implementation, rating and settlements engine 112 discovers and extracts events 104 from activity data 102. Events 104 are discovered within activity data 102 responsive to one or more event-generation plug-ins 106. Each event-generation plug-in 106 is configured to discover a different type of event 104. In a sense, event-generation plug-ins 106 convert activity data 102 into events 104.

Each event 104 is applied to and propagated through event pipeline 110. After any appropriate preparation or other processing, event pipeline 110 causes an event 104 to be rated responsive to at least one rating-model plug-in 108. After an event 104 is rated, rating and settlements engine 112 outputs a rated event 104(RtdE).

Figure 2:
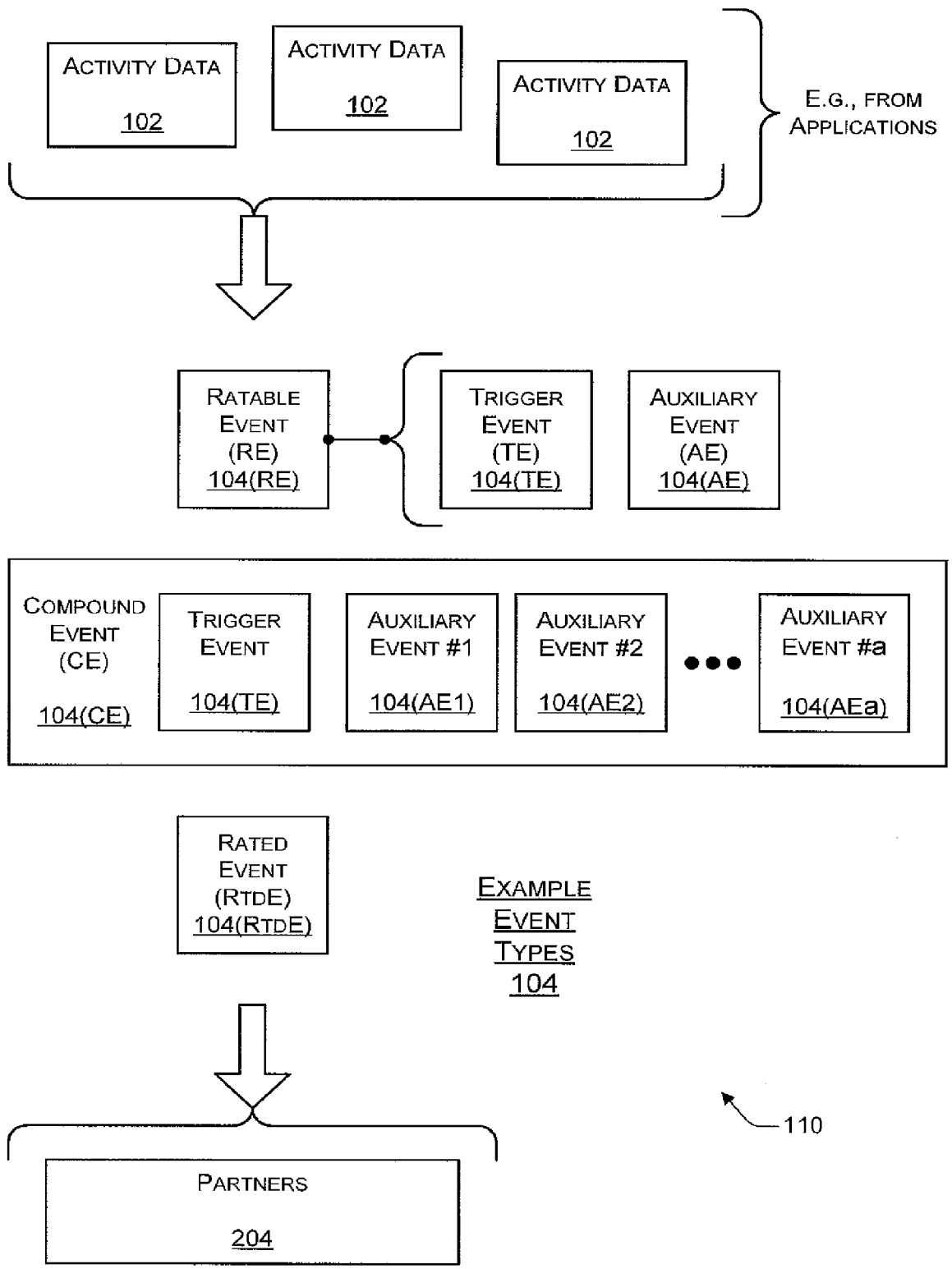
FIG. 2 is a block diagram illustrating example event types for the event pipeline.

FIG. 2 is a block diagram illustrating example event types 104 for event pipeline 110. As illustrated, event pipeline 110 includes up to five (5) different types of events 104. These illustrated example events types 104 are: a ratable event 104 (RE), a trigger event 104(TE), an auxiliary event 104(AE), a compound event 104(CE), and a rated event 104(RtdE). Event pipeline 110 may, however, include other types of events. The block diagram of FIG. 2 also illustrates activity data 102 and partners 204.

Activity data 102 may be provided, for example, from external applications (e.g., consumer, system, etc. applications). From activity data 102, a ratable event 104(RE) is discovered and/or extracted using an event-generation plug-in 106 (of FIG. 1) or provided directly by an external application (e.g., by a user application under a push model). A ratable event 104(RE) is user activity that is relevant to a settlement. At times, activity data 102 may be converted or synthesized into a ratable event 104(RE). Ratable events 104 (RE) can represent business concepts in the contract domain space (e.g., net cash, settled payment, user registration, etc.).

Each ratable event 104(RE) is classified as a trigger event 104(TE) or an auxiliary event 104(AE). Those ratable events 104(RE) that are responsible for initiating settlements are classified as trigger event 104(TE). An example of a trigger event 104(TE) is a settled payment. Those ratable events 104(RE) that help or supplement the rating process by contributing additional context are classified as auxiliary events 104(AE). An example of an auxiliary event 104(AE) is a subscription purchase profile.

Thus, each trigger event 104(TE) may be supplemented by one or more auxiliary events 104(AE). A trigger event 104 (TE) is combined with and bound to one or more supplementary auxiliary events 104(AE) to create a compound event 104(CE). As illustrated, compound event 104(CE) includes one trigger event 104(TE) and "a" auxiliary events, where "a" is some integer. Specifically, auxiliary event #1 104(AE1), auxiliary event #2 104(AE2) . . . auxiliary event #a 104(AEa) are shown to be part of compound event 104(CE).

Within event pipeline 110, compound events 104(CE) are rated using a rating-model plug-in 108 (of FIG. 1). The rating of a compound event 104(CE) produces a rated event 104 (RtdE). Rated events 104(RtdE) are forwarded from event pipeline 110 to any one or more of many possible destinations. Example destinations include, but are not limited to, billing systems, archival storage systems, partners 204, and so forth.

Figure 3:
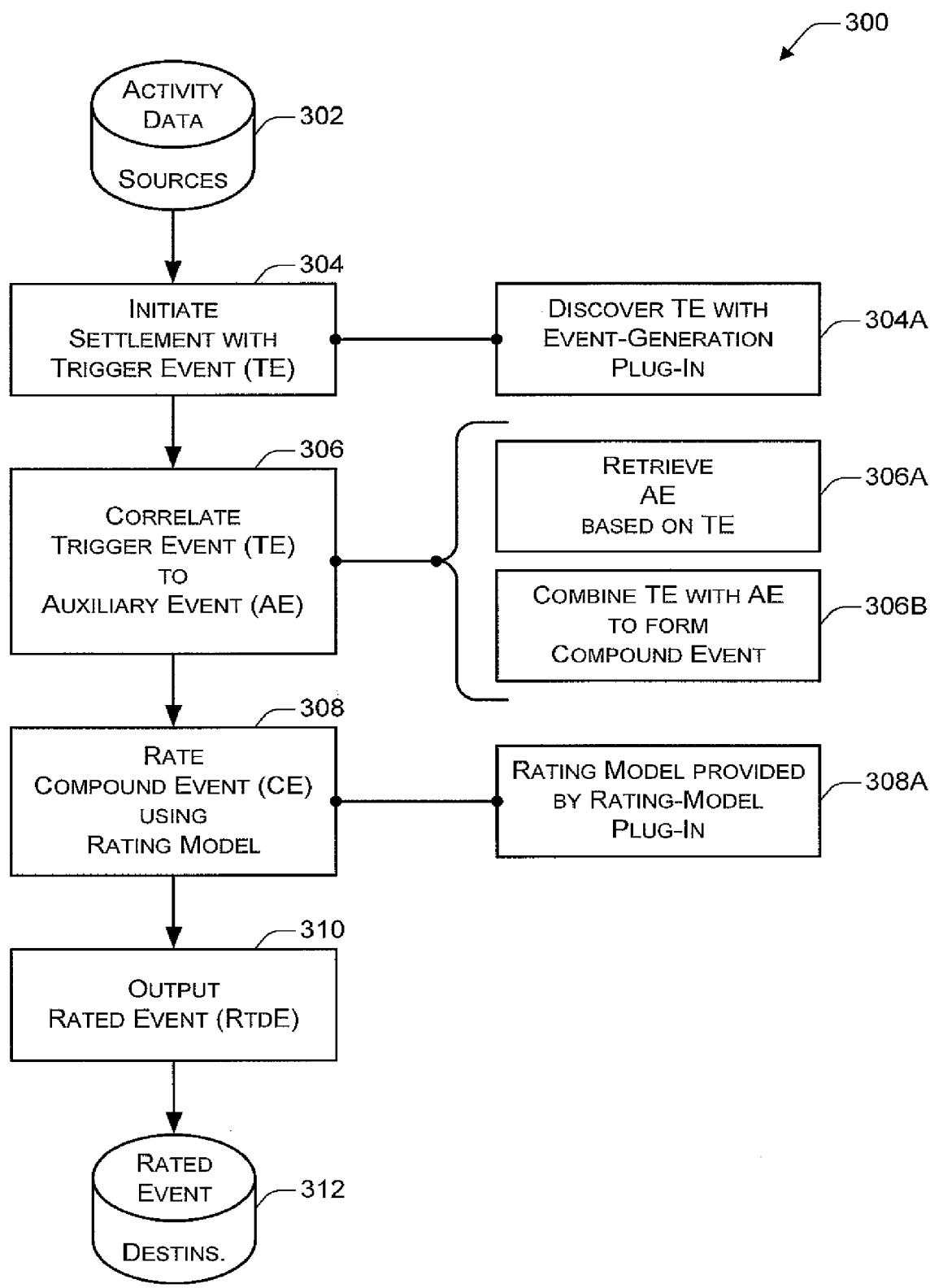
FIG. 3 is a flow diagram that illustrates an example of a method for rating and settling events.

FIG. 3 is a flow diagram 300 that illustrates an example of a method for rating and settling events. Flow diagram 300 includes four (4) "primary" blocks 304-310 and four (4) "secondary" blocks 304A, 306A, 306B, and 308A. Flow diagram 300 also includes two (2) data elements 302 and 312. Although the actions of flow diagram 300 may be performed in other environments and with a variety of hardware and software combinations, a rating and settlements engine 112 (of FIG. 1) having an event pipeline 110 with different types of events 104 (of FIG. 2) may be used to implement the method of flow diagram 300.

The two data elements are: activity data sources 302 and rated event destinations 312. Activity data sources 302 provide (e.g., store, forward, transmit, etc.) activity data 102.

Rated event destinations 312 receive (e.g., store, process, transmit, etc.) rated events 104(RtdE).

At block 304, settlement is initiated with a trigger event. For example, event-driven system 100 may be initiated upon discovering a trigger event 104(TE). At block 304A, the trigger event is extracted with an event-generation plug-in. For example, an activity data 102 may be discovered from activity data sources 302 and extracted as a trigger event 104(TE) using an event-generation plug-in 106.

At block 306, the trigger event is correlated to one or more auxiliary events. For example, trigger event 104(TE) may be correlated with one or more auxiliary events 104(AE). At block 306A, the one or more correlated auxiliary events are retrieved based on the trigger event. For example, one or more correlated auxiliary events 104(AE) may be retrieved from activity data sources 302 based on trigger event 104(TE). At block 306B, the trigger event is combined with the auxiliary event(s) to form a compound event. For example, compound event 104(CE) may be formed by combing trigger event 104(TE) with auxiliary events #1 . . . #a 104(AE1 . . . AEa).

At block 308, the compound event is rated using a rating model to produce a rated event. For example, compound event 104(CE) may be rated using a rating model to produce a rated event 104(RtdE). At block 308A, the rating is performed using a rating module provided by a rating-model plug-in. For example, compound event 104(CE) may be rated using a rating-model plug-in 108 to produce rated event 104 (RtdE).

At block 310, the rated event is output from the rating and settlements engine. For example, rated event 104(RtdE) may be output from rating and settlements engine 112 and sent to one or more rated event destinations 312.

SPECIFIC EXAMPLE IMPLEMENTATIONS FOR A RATING AND SETTLEMENTS ENGINE

Figure 4B:
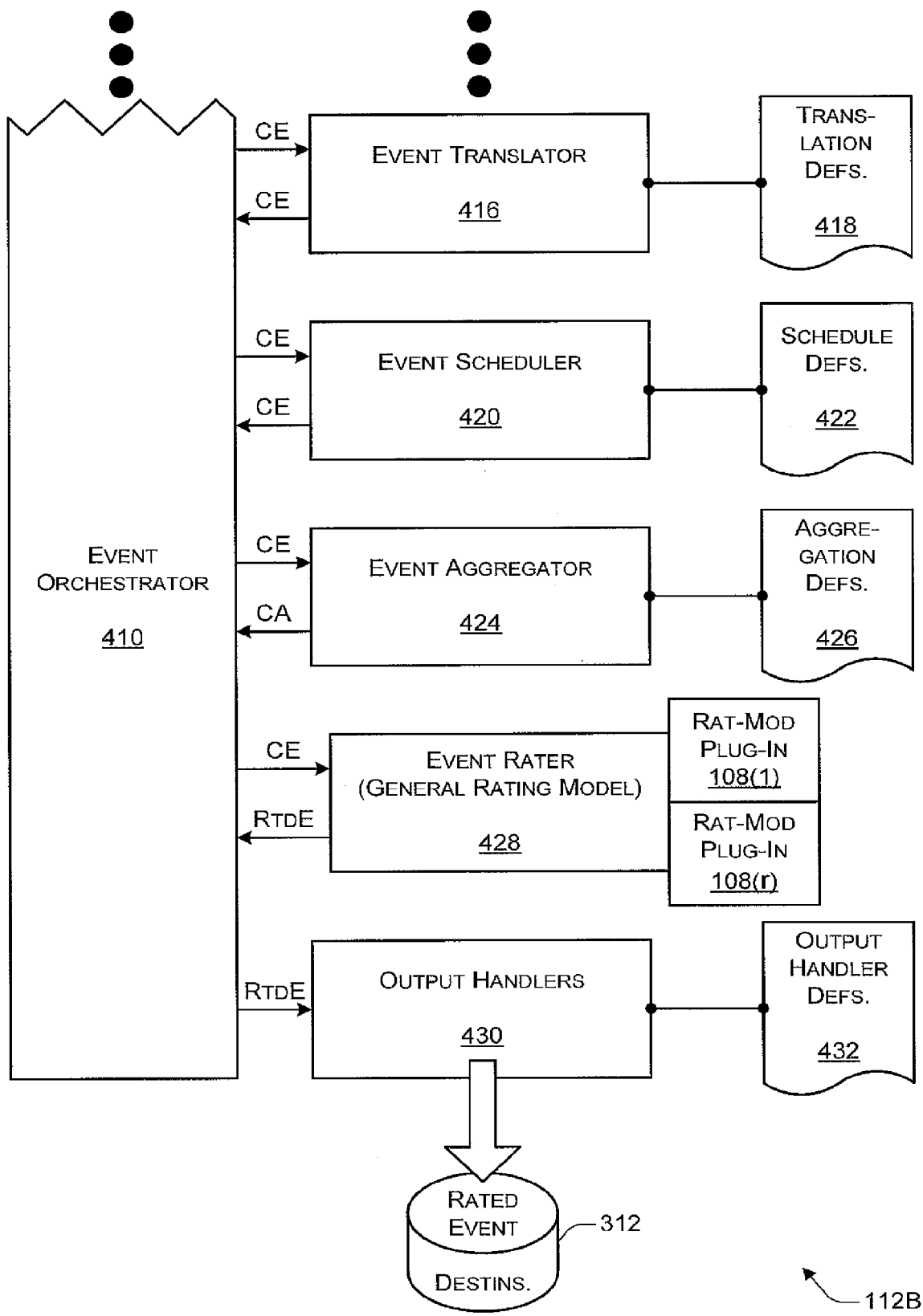

FIGS. 4, 4A, and 4B form a block diagram that illustrates example components of rating and settlements engine 112. As indicated by FIG. 4, rating and settlements engine 112 is separated into a top portion and a bottom portion. The top portion 112A of rating and settlements engine 112 is depicted in FIG. 4A, and the bottom portion 112B is depicted in FIG. 4B.

In addition to top portion 112A of the rating and settlements engine, FIG. 4A includes activity data sources 302. Activity data sources 302 include, by way of example but not limitation, subscription data, billing data, usage data, financial reporting data, and so forth. As is explained further herein below, activity data sources 302 may also include an aggregate event data store, a rated event data store, a scheduled event store, and so forth. Although activity data 102 is represented in FIG. 4A as activity data sources 302, activity data 102 may also be pushed into rating and settlements engine 112 without active reading by an event generation plug-in 106.

As illustrated, top portion 112A of the rating and settlements engine (at FIG. 4A) includes a control database 402, an event generator 404, ratable events definitions 406, multiple event-generation plug-ins 106, a trigger event queue 408, (part of) an event orchestrator 410, an event compounder 412, and compound event definitions 414.

In addition to bottom portion 112B of the rating and settlements engine, FIG. 4B includes rated event destinations 312. Rated event destinations 312 include, but are not limited to, data base storage, settlement history storage, business model partners, and so forth.

As illustrated, bottom portion 112B of the rating and settlements engine (at FIG. 4B) includes (the other part of) event orchestrator 410, an event translator 416, translation definitions 418, an event scheduler 420, schedule definitions 422, an event aggregator 424, aggregation definitions 426, an event rater 428, multiple rating-model plug-ins 108, one or more output handlers 430, and output handler definitions 432.

Rating and settlements engine 112 therefore includes multiple different sets of definitions. These definition sets include, by way of example but not limitation, ratable event definitions 406, compound event definitions 414, translation definitions 418, schedule definitions 422, aggregation definitions 426, and output handler definitions 432. These multiple definition sets jointly define interpretable and operable event configurations. Because the event configurations may be changed by altering the underlying definitions, the adaptability and flexibility of rating and settlements engine 112 is increased. The definition sets may be formulated in accordance with, for example, an extensible markup language format.

In operation, event generator 404 uses ratable event definitions 406 along with event-generation plug-ins 106 to discover ratable events 104(RE) (of FIG. 2) from activity data sources 302. Activity data 102 (of FIGS. 1 and 2, but not separately shown in FIG. 4A) of activity data sources 302 may be pushed by activity data sources 302 to event generator 404, or activity data 102 may be pulled by event generator 404 from activity data sources 302. Thus, event generator 404 monitors activity data sources 302 by waiting to receive activity data 102, by mining for activity data 102, by requesting general or specific activity data 102, some combination thereof, and so forth.

In a described implementation, event generator 404 generates ratable events responsive to the application of one or more event-generation plug-ins 106 to activity data. As shown, there are "e" event-generation plug-ins 106, with "e" being an integer. Specifically, event-generation plug-in 106 (1), event-generation plug-in 106(2) . . . event-generation plug-in 106(e) are shown. Each event-generation plug-in 106 is designed to target a different event type 104 that is defined by ratable event definitions 406.

Examples of event-generation plug-in 106 are a sign-up event-generation plug-in that discovers web service subscription sign-up events, a settled charge event-generation plug-in that discovers settled subscription charge events, an item purchase event-generation plug-in that discovers the purchase of items resulting from a link or other referral, a click-through event-generation plug-in that discovers advertisement and/or search result click-throughs, and so forth.

Control database 402 is responsible for temporally synchronizing the various activity data sources 302 in view of operations by event generator 404. For example, the control database 402 can ensure that no event 104 of a set of interrelated events 104 is processed until all interrelated events are available. In other words, it effectively synchronizes the calendars of dependent data sources. Moreover, control database 402 can assign work units to the event orchestration chain and track the state of the assigned work units.

Event generator 404 analyzes discovered ratable events 104(RE) and classifies them into trigger events 104(TE) and auxiliary events 104(AE). Because trigger events initiate the event-driven ratings system, the trigger event (TE) is forwarded from event generator 404 to trigger event queue 408. Auxiliary events, on the other hand, may be held until requested (e.g., by event compounder 412) or sent to an auxiliary event store (not separately shown). The auxiliary event store may function as an additional activity data source 302 that is accessed by event generator 404 and/or event compounder 412.

Trigger event queue 408 holds trigger events until event orchestrator 410 is prepared to accept them. Event orchestrator 410 maintains an event processor pipeline to process the events. It forwards each event to the next event processor (e.g., 412, 416, 420, 424, 428, 430) in the pipeline and receives the processed event in return. The processed event is then fed to the next event processor in the pipeline. Alternatively, events may propagate through the pipeline directly from one event processor to the next without being routed through or managed by an event orchestrator 410.

After event orchestrator 410 accepts a trigger event from trigger event queue 408, event orchestrator 410 forwards it to event compounder 412. Event compounder 412 uses compound event definitions 414 to create a compound event 104 (CE) from the trigger event. In accordance with compound event definitions 414, event compounder 412 retrieves one or more auxiliary events 104(AE). These supplementing auxiliary events may be from new activity data 102, may be from stored ratable events 104(RE) (e.g., previously-discovered auxiliary events that were moved to the auxiliary event store), and so forth.

Thus, compound event definitions 414 stipulate what additional context data is to be fetched as the supplementing auxiliary events. In effect, compound event definitions 414 specify filters on the fetched events. After the stipulated auxiliary events for a given trigger event have been retrieved, event compounder 412 combines the given trigger event and the retrieved auxiliary event(s) to form a compound event (CE). The compound event may have, however, open slots for event aggregations at a subsequent pipeline stage. The compound event is provided back to event orchestrator 410.

Continuing at top portion 112B of the rating and settlements engine (at FIG. 4B), event orchestrator 410 provides the compound event to event translator 416. Event translator 416 makes any appropriate or desired conversions in accordance with translation definitions 418. The compound event may be translated in-memory by applying translation functions to the attributes of the compound event to form new attributes. These conversions include, by way of example but not limitation, unit translations (e.g., imperial to metric), normalization of values, binning (e.g., conversion of ranged data into discrete values), some combination thereof, and so forth. After translation, if any, event translator 416 passes the processed compound event back to event orchestrator 410.

Event orchestrator 410 next provides the compound event to event scheduler 420. Event scheduler 420 makes any appropriate or desired event scheduling in accordance with schedule definitions 422. For example, the current compound event may be delayed pending a certain date or a subsequent action. Also, some other event 104 may be created and scheduled to be activated at some future time and placed into the event-driven system (e.g., at a scheduled event store of activity data sources 302, at event generator 404, etc.).

More generally, compound events can initiate a scheduled event, which is a ratable event that will materialize, either once or on a recurring basis, at some point in the future. The materialized scheduled event may be treated as any other ratable trigger event. It is therefore joined with auxiliary events to form another compound event that is to propagate through the event pipeline. The compound events that initiate scheduling, and the scheduled ratable events that are created as a result, are defined by schedule definitions 422. After scheduling, if any, event scheduler 420 passes the processed compound event back to event orchestrator 410.

Event orchestrator 410 provides the compound event to event aggregator 424. Event aggregator 424 effects any appropriate or desired event aggregations in accordance with aggregation definitions 426. For example, the current compound event may increment a counter that is tracking like events. Also, event aggregator 424, in conjunction with event rater 428, may implement payment tiering in which an obligated payment value is based, at least partly, on a total number of aggregated counts (e.g., consumers, click-throughs, etc.).

More generally, the compound event can initiate an event aggregation, contribute to an event aggregation (e.g., as a sum, an average, a sliding window, etc.), or cause the maturation of the event aggregation. The aggregation can be anywhere from the scope of an individual user to the scope of any of the keys provided in the contributing compound event. The aggregation matures when the aggregated value crosses a predetermined threshold, when a given period of time elapses, when a compound event causes it per se to mature, and so forth. A matured aggregated event is then formed that is a ratable event. It may be stored at an aggregate event store that is part of activity data sources 302. It is eventually sent through the engine. The aggregated ratable event is joined with stipulated auxiliary events in event compounder 412 to form one or more compound events that also propagate through the event pipeline.

Finally, at event aggregator 424, any open event aggregation slots in the compound event are filled. After aggregation, if any, event aggregator 424 passes the processed compound event back to event orchestrator 410.

Event orchestrator 410 provides the compound event to an event rater 428. Event rater 428 rates the compound event responsive to one of the rating-model plug-ins 108. As shown, there are "r" rating-model plug-ins 108, with "r" being an integer. Specifically, rating-model plug-in 108(1) . . . rating-model plug-in 108(r) are shown.

Each rating-model plug-in 108 is designed to implement a respective different rating model in accordance with a respective different model definition. The model definitions associate compound events and event aggregations with classes that implement the model. Examples of rating-model plug-ins include, but are not limited to, a general rating model, a contract-specific rating model, a neural network-based rating model, a context-based rating (CBR) model, some combination thereof, and so forth. An example CBR model is described further herein below with particular reference to FIGS. 5 and 6.

The CBR model is a rating-model plug-in 108 that accepts any one compound event and/or one or more event aggregations and looks up a rate by matching the name-value attributes of the compound events and event aggregations with a rate table. This returns one or more rate functions that are calculated in terms of the attributes of the incoming compound events and event aggregations. Each rate function is then resolved to create a rated event.

After application of the selected rating-model plug-in 108 to the compound event, a rated event 104(RtdE) is produced. The rated event (RtdE) is passed from event rater 428 to event orchestrator 410.

Event orchestrator 410 provides the rated event to one or more output handlers 430. Output handler 430 directs the rated event to any of the many possible appropriate and/or desired rated event destinations 312 in accordance with output handler definitions 432. Rated event destinations 312 include, but are not limited to, rated event data consumers generally, contractual partners, a settlement history database, some combination thereof, and so forth.

Figure 5:
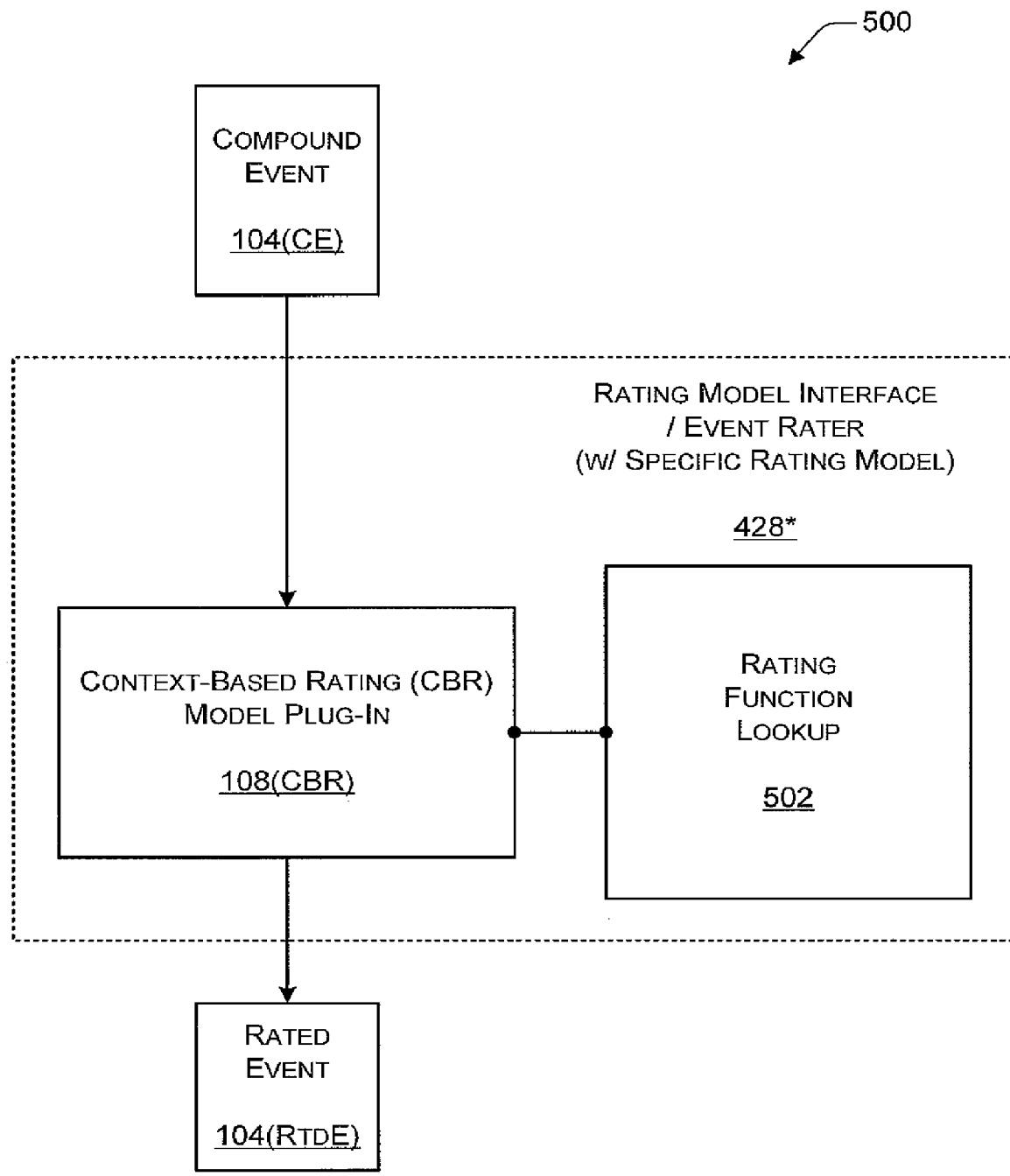
FIG. 5 is a block diagram of an example rating model interface having a rating function lookup that may be used by a rating and settlements engine.

FIG. 5 is a block diagram 500 of an example rating model interface having a rating function lookup 502 that may be used by a rating and settlements engine. Block diagram 500 illustrates a rating model interface or event rater 428*. Event rater 428* includes a specific rating model by virtue of its specific rating-model plug-in 108. The illustrated specific rating-model plug-in is a context-based rating (CBR) model plug-in 108(CBR).

Event rater 428* receives a particular compound event 104(CE) from event orchestrator 410 (of FIG. 4B). By way of example only, compound event 104(CE) may be a settled charge compound event. A settled charge compound event 104(CE) may be a payment that has been received from a customer, for instance.

CBR model plug-in 108(CBR) applies rating function lookup 502 to compound event 104(CE). Application of rating function lookup 502 to compound event 104(CE) results in the production of a rated event based on associations present within rating function lookup 502. Rating function lookup 502 is described further herein below with particular reference to FIG. 6.

In other words, event rater 428* produces rated event 104(RtdE) from compound event 104(CE) responsive to CBR model plug-in 108(CBR). CBR model plug-in 108(CBR) determines rated event 104(RtdE) from compound event 104(CE) based on rating function lookup 502.

Figure 6:
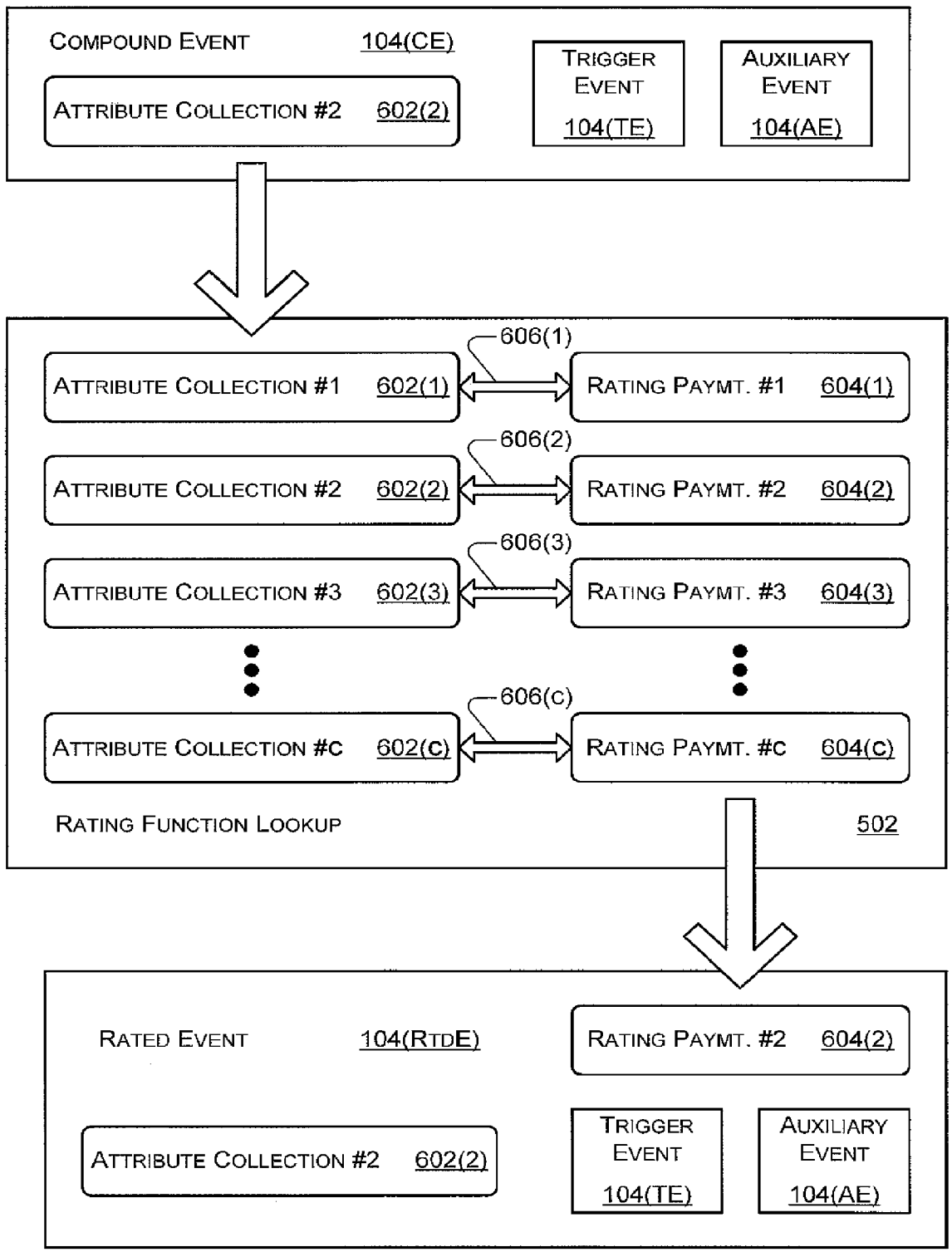
FIG. 6 is a block diagram of an example rating function lookup data structure and its application to a compound event to determine a rated event.

FIG. 6 is a block diagram 600 of an example rating function lookup data structure 502 and its application to compound event 104(CE) to determine rated event 104(RtdE). Compound event 104(CE) includes a trigger event 104(TE), an auxiliary event 104(AE), and an attribute collection #2 602(2). Attribute collection #2 602(2) of compound event 104(CE) may be derived from, or even included within, trigger event 104(TE) and/or auxiliary event 104(AE).

As illustrated, rating function lookup data structure 502 includes multiple (e.g., "c", with "c" being an integer) respective associations 606 between respective attribute collections 602 and respective rating payments 604. Each association 606 comprises an entry in rating function lookup data structure 502. Although each association 606 includes a rating payment 604, it may more generally be realized as a rating function.

More specifically, rating function lookup data structure 502 includes an attribute collection #1 602(1) that is associated 606(1) with a rating payment #1 604(1), an attribute collection #2 602(2) that is associated 606(2) with a rating payment #2 604(2), an attribute collection #3 602(3) that is associated 606(3) with a rating payment #3 604(3) . . . an attribute collection #c 602(c) that is associated 606(c) with a rating payment #c 604(c).

An attribute collection 602 is a set of attributes that a compound event may possess. An example attribute collection 602 for a settled charge compound event may be a manufacturer identifier, a subscription level, and a current tier. A rating payment 604 is a payment obligation. The obligation may be monetary or some other contractual obligation. The obligation may be towards (e.g., for the accounts receivable of) the operator of the rating and settlements engine or away from (e.g., for the accounts payable of) the operator.

Generally, for a CBR model, an event 104 is rated by matching its collected attributes to the attributes of an entry in rating function lookup 502. The associated rating payment is the rating for the event. When rating functions are employed, the rating function is evaluated to attain the final rating payment. The rating function may be evaluated using, for example, the collected attributes of the compound event.

In block diagram 600, compound event 104(CE) includes attribute collection #2 602(2). The second entry 606(2) of rating function lookup 502 associates attribute collection #2 602(2) with rating payment #2 604(2). Compound event 104(CE) therefore matches the second entry 606(2) of rating function lookup 502. Hence, rated event 104(RtdE) is produced by adding rating payment #2 604(2) of the second entry 606(2) to compound event 104(CE).

EXAMPLE DEVICE IMPLEMENTATIONS FOR A RATING AND SETTLEMENTS ENGINE

Figure 7:
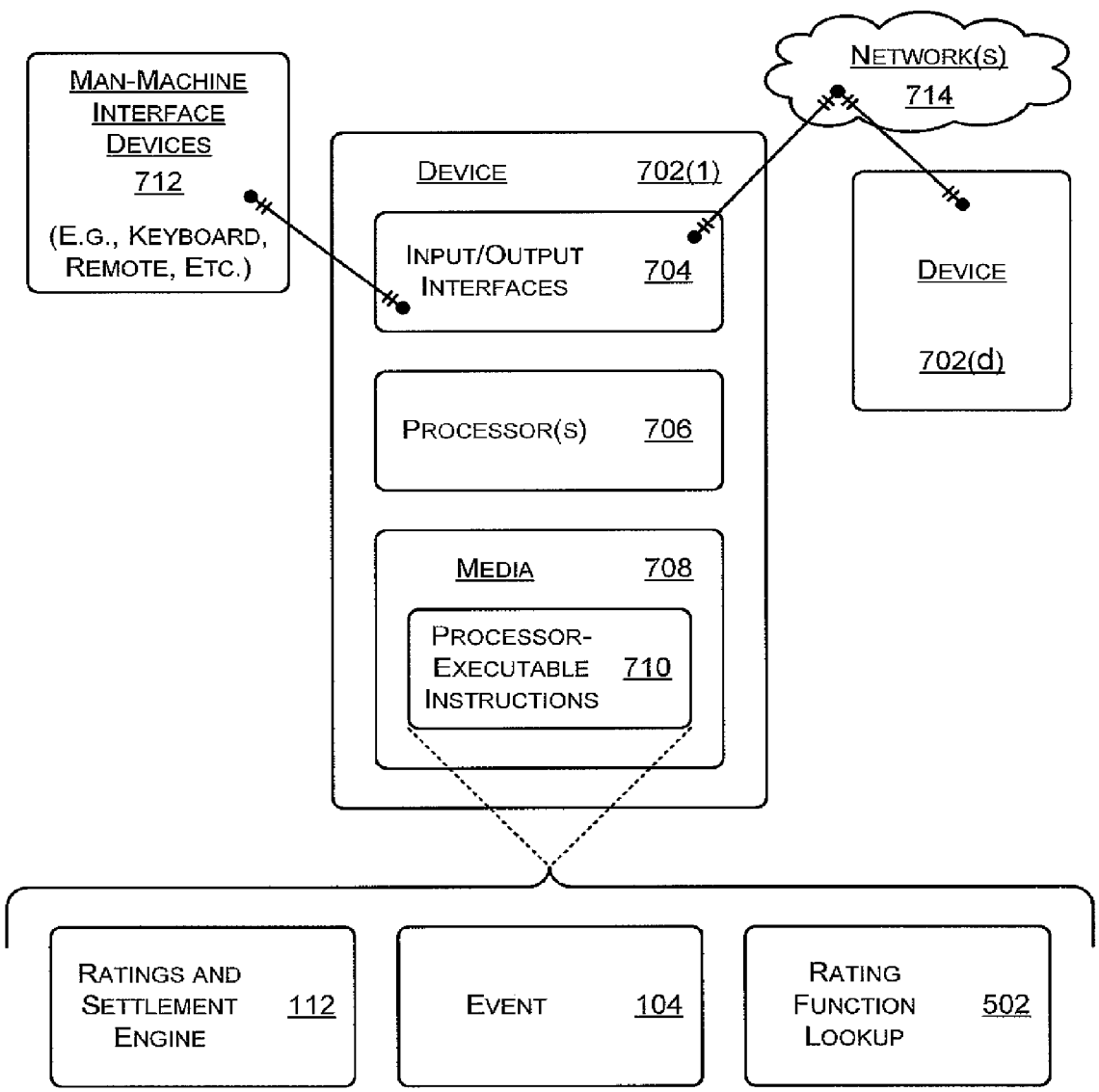
FIG. 7 is a block diagram of an example device that may be employed in conjunction with a rating and settlements engine.

FIG. 7 is a block diagram of an example device 702 that may be employed in conjunction with a rating and settlements engine. For example, a device 702 may realize, execute, or otherwise implement a rating and settlements engine 112 as described herein above. In certain implementations, devices 702 are capable of communicating across one or more networks 714, such as a local area network (LAN), an intranet, and/or the internet.

As illustrated, two devices 702(1) and 702(d) are capable of engaging in communication exchanges via network 714. Example relevant communication exchanges include retrieving activity data 102 and/or transmitting rated event 104(RtdE) information from and to partners. Other example relevant communication exchanges include sharing activity data 102 and or any event 104 information between devices 702 for scalability, reliability, or other purposes.

For scalability purposes, rating and settlements engine 112 and event 104 information may be distributed across multiple devices 702. For reliability purposes, rating and settlements engine 112 and event 104 information may be redundantly operated and/or stored on back-up server devices 702, and so forth. Multiple processors per device and hierarchical storage may also be employed.

More generally, device 702 may represent a server or a client device; a storage device; a workstation or other general computer device; a set-top box or other television device; a personal digital assistant (PDA), mobile telephone, or other mobile appliance; some combination thereof; and so forth. As illustrated, device 702 includes one or more input/output (I/O) interfaces 704, at least one processor 706, and one or more media 708. Media 708 includes processor-executable instructions 710. Although not specifically illustrated, device 702 may also include other components.

In a described implementation of device 702, I/O interfaces 704 may include (i) a network interface for communicating across network(s) 714, (ii) a display device interface for displaying information on a display screen, (iii) one or more man-machine device interfaces, and so forth. Examples of (i) network interfaces include a network card, a modem, one or more ports, and so forth. Examples of (ii) display device interfaces include a graphics driver, a graphics card, a hardware or software driver for a screen/television or printer, etc. Examples of (iii) man-machine device interfaces include those that communicate by wire or wirelessly to man-machine interface devices 712 (e.g., a keyboard or keypad, a mouse or other graphical pointing device, a remote control, etc.) to manipulate and interact with a UI.

Generally, processor 706 is capable of executing, performing, and/or otherwise effectuating processor-executable instructions, such as processor-executable instructions 710. Media 708 is comprised of one or more processor-accessible media. In other words, media 708 may include processor-executable instructions 710 that are executable by processor 706 to effectuate the performance of functions by device 702.

Thus, realizations for a rating and settlements engine may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 706 may be implemented using any applicable processing-capable technology. Media 708 may be any available media that is included as part of and/or accessible by device 702. It includes volatile and non-volatile media, removable and non-removable media, and storage and transmission media (e.g., wireless or wired communication channels). For example, media 708 may include an array of disks for longer-term mass storage of processor-executable instructions, random access memory (RAM) for shorter-term storage of instructions that are currently being executed, flash memory for medium to longer term and/or portable storage, optical disks for portable storage, and/or link(s) on network 714 for transmitting instructions or other communications, and so forth.

As specifically illustrated, media 708 comprises at least processor-executable instructions 710. Generally, processor-executable instructions 710, when executed by processor 706, enable device 702 to perform the various functions described herein. Processor-executable instructions 710 may include, for example, a rating and settlements engine 112, an event 104 (of any type), a rating function lookup 502, some combination thereof, and so forth. Any of the components of rating and settlements engine 112 as described herein above with particular reference to FIGS. 4, 4A and 4B may also be realized as processor-executable instructions 710.

The devices, actions, aspects, features, functions, procedures, modules, data structures, schemes, approaches, UIs, architectures, components, etc. of FIGS. 1-7 are illustrated in diagrams that are divided into multiple blocks. However, the order, interconnections, interrelationships, layout, etc. in which FIGS. 1-7 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for a rating and settlements engine.

Although systems, media, devices, methods, procedures, apparatuses, components, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A system comprising:
a processor;
memory communicatively coupled to the processor, the memory comprising instructions that direct the processor to implement a rating and settlement engine module, the rating and settlement engine being configured to produce one or more rated events to facilitate calculation of proceedings to be exchanged between two or more contracting partners in one or more diverse settlement scenarios, the rating and settlement engine comprising:
an event generator configured to receive activity data and accept at least one event-generation plug-in to extract ratable events from the activity data responsive to the event-generation plug-in and to classify the ratable events into at least trigger events and auxiliary events, wherein:
the event-generation plug-in is configured to discover a type of the ratable events;
the ratable events are user activities relevant to a settlement in the one or more diverse settlement scenarios;
the trigger events are events responsible for initiating the settlement; and
the auxiliary events are events helping rating process of the rating and settlement engine by contributing additional context to the rating and settlement engine;
an event compounder configured to form compound events by combining a particular trigger event with one or more supplementing auxiliary events based on the particular trigger event; and
an event rater configured to produce, responsive to at least a context-based rating (CBR) model plug-in, rated events based on the compound events using at least one rating model implemented by the CBR model plug-in, the rated events serving as a basis for determining an associated rating payment to be exchanged between the two or more contracting partners, wherein:
the CBR model plug-in includes a rating function lookup data structure having multiple entries, each entry of the multiple entries associating one or more attributes with at least one rating function;
the CBR model plug-in matches the one or more attributes that are associated with the compound event to the one or more attributes of an entry in the data structure to determine at least one rating function for the compound event; and
the rated events are produced by:
looking up the at least one rating function determined by the CBR model plug-in; and
creating the rated events based on the at least one rating function.

2. The system as recited in claim 1, wherein the rating and settlement engine further comprises: an event orchestrator that implements an event processing pipeline by facilitating direct or indirect passing of events from the event generator to the event compounder and from the event compounder to the event rater.

3. The system as recited in claim 1, wherein the rating and settlement engine further comprises: an event translator that converts attributes of the compound events in accordance with translation definitions.

4. The system as recited in claim 1, wherein the rating and settlement engine further comprises: an event scheduler that initiates scheduled events based on the compound events and in accordance with scheduler definitions.

5. The system as recited in claim 1, wherein the rating and settlement engine further comprises: an event aggregator that monitors the compound events to detect if the compound events initiate, contribute to, or cause maturation of one or more aggregated events in accordance with aggregation definitions.

6. The system as recited in claim 1, wherein the rating and settlement engine further comprises: an output handler that accepts the rated events and provides the rated events to one or more rated event destinations.

7. One or more computer-readable storage media encoded with computer-executable instructions that, when executed on a computer, configure the computer to implement an adaptable rating and settlements engine configured to produce one or more rated events to facilitate calculation of proceedings to be exchanged between two or more contracting partners in one or more diverse settlement scenarios, the adaptable rating and settlement engine being configured to perform a method, the method comprising:

receiving activity data and one or more event-generation plug-ins and synthesizing ratable events from the activity data, wherein:
  each of the one or more event-generation plug-ins is configured to discover a different type of the ratable events; and
  the ratable events are user activities relevant to a settlement in the one or more diverse settlement scenarios;
classifying the ratable events into trigger events and auxiliary events, wherein:
  the trigger events are events responsible for initiating the settlement; and
  the auxiliary events are events helping rating process of the rating and settlement engine by contributing additional context to the rating and settlement engine;
forming compound events by combining the trigger events with the auxiliary events based on the trigger events; and
rating, responsive to at least a context-based rating (CBR) model plug-in, the compound events using a rating model implemented by the CBR model plug-in, wherein:
  the CBR model plug-in includes a rating function lookup data structure having multiple entries, each entry of the multiple entries associating one or more attributes with at least one rating function;
  the CBR model plug-in matches the one or more attributes that are associated with the compound event to the one or more attributes of an entry in the data structure to determine at least one rating function for the compound event;
  the rating comprises creating rated event based on the at least one rating function determined by the CBR model plug-in; and
  the rated events serve as a basis for determining an associated rating payment to be exchanged between the two or more contracting partners.

8. The one or more computer-readable storage media as recited in claim 7, wherein the adaptable rating and settlement engine is further capable of accepting multiple rating-model plug-ins, each rating-model plug-in configured to apply a different rating model to the ratable events.

9. The one or more computer-readable storage media as recited in claim 7, wherein the trigger events are pushed into the event pipeline, and the auxiliary events are pulled into the event pipeline.

10. The one or more computer-readable storage media as recited in claim 9, wherein the event pipeline retrieves one or more auxiliary events based on a trigger event.

11. The one or more computer-readable storage media as recited in claim 7, wherein the multiple event-generation plug-ins comprise at least one of a sign-up event-generation plug-in that discovers web service subscription sign-up events or a settled charge event-generation plug-in that discovers settled subscription charge events.

12. A computer-implemented method of producing rated events to facilitate calculation of proceedings to be exchanged between two or more contracting partners in one or more diverse settlement scenarios, the method comprising: initiating a settlement with a trigger event, the trigger event comprising one or more user activities that are generated at a computer having one or more processors and memory and are responsible for the settlement in one or more diverse settlement scenarios; correlating the trigger event to one or more auxiliary events based on the trigger event, wherein the auxiliary events are generated at the computer and contribute additional context to facilitate the computer producing the rated events; combining the trigger event with the one or more correlated auxiliary events to form a compound event in the memory of the computer; and rating, by the one or more processors of the computer and in accordance with a rating model implemented by a context-based rating (CBR) model plug-in, the compound event to produce a rated event, wherein: the CBR model plug-in includes a rating function lookup data structure having multiple entries, each entry of the multiple entries associating one or more attributes with at least one rating function; the CBR model plug-in matches the one or more attributes that are associated with the compound event to the one or more attributes of an entry in the data structure to determine at least one rating function for the compound event; the rating comprises creating the rated event based on the at least one rating function determined by the CBR model plug-in; and the rated event serves as a basis for determining an associated rating payment to be exchanged between the two or more contracting partners.

13. The method as recited in claim 12, wherein the initiating comprises discovering the trigger event from among activity data using an event-generation plug-in.

14. The method as recited in claim 13, further comprising: acquiring the activity data from subscription data, billing data, usage data, or financial reporting data.

* * * * *